(12) United States Patent
Kamiya

(10) Patent No.: US 6,473,847 B1
(45) Date of Patent: Oct. 29, 2002

(54) MEMORY MANAGEMENT METHOD FOR USE IN COMPUTER SYSTEM

(75) Inventor: Ryo Kamiya, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/281,533

(22) Filed: Mar. 30, 1999

(30) Foreign Application Priority Data

Mar. 31, 1998 (JP) .......................................... 10-085803

(51) Int. Cl.$^7$ ............................................... G06F 12/00

(52) U.S. Cl. ...................................... 711/171; 711/173

(58) Field of Search ................................ 711/170, 171, 711/173, 160

(56) References Cited

U.S. PATENT DOCUMENTS 5,440,687 A * 8/1995 Coleman et al. ............. 709/236
5,832,526 A * 11/1998 Schuyler ..................... 707/205
5,897,660 A * 4/1999 Reinders et al. ............. 711/170

* cited by examiner

Primary Examiner—Matthew Kim
Assistant Examiner—Matthew D. Anderson
(74) Attorney, Agent, or Firm—Morrison & Foerster LLP

(57) ABSTRACT

The present invention is directed to a method for managing memory in a computer whereby memory is divided into a first and a second section, and whereby the first and second sections are separately managed via a CPU. In accordance with the preferred embodiment of the present invention, data characteristics are used to determine which one of the first or second sections the data should be stored in. When the stored data are to be read out from the first section, single physical address information corresponding to a start position of the first section is received from the CPU so that a plurality of physical addresses corresponding to the individual read addresses are generated on the basis of the received physical address. However, when the stored data are to be read out from the second section, logical read addresses are generated and the physical address information is received from the CPU at each break between the pages so that the logical read addresses are converted into physical addresses using the received physical address. As a result, the frequency of interrupts made to the CPU for receiving the physical address can be considerably lowered.

19 Claims, 6 Drawing Sheets

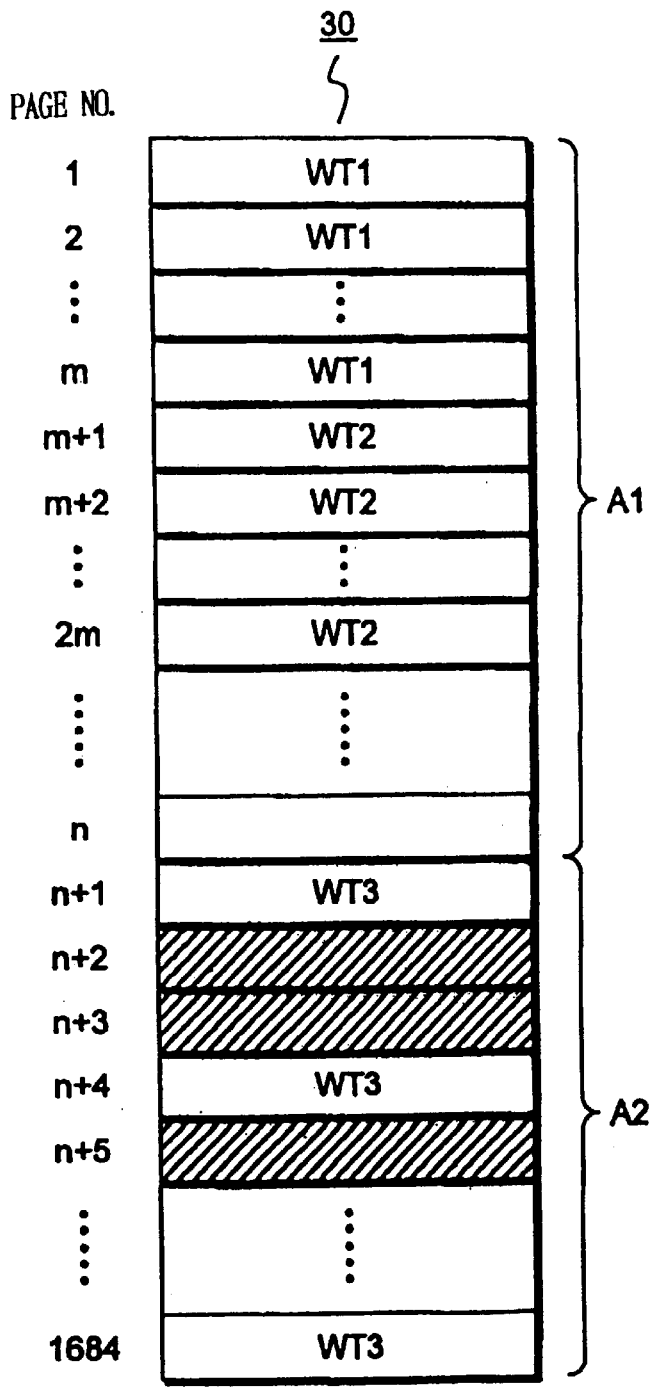
F I G. 3
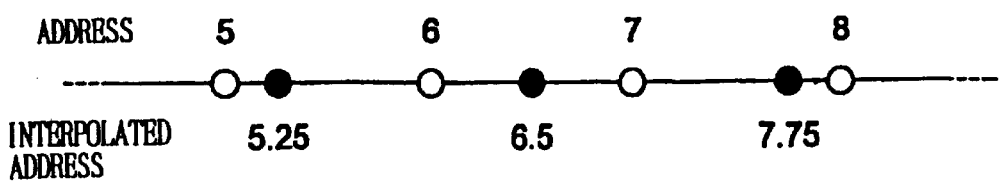
F I G. 4

MEMORY MANAGEMENT METHOD FOR USE IN COMPUTER SYSTEM

BACKGROUND OF THE INVENTION

The present invention relates to an improved memory management method capable of efficient data transfer and a computer system and a tone generator system employing the memory management method.

Examples of the conventionally-known data transfer method for use in a computer system includes the so-called DMA (Direct Memory Access) method which is characterized by transferring data between a particular device and a main memory directly without intervention of a CPU (Central Processing Unit) of the system. Because the main memory is not managed via the CPU, the DMA method achieves data transfer at high speed.

In a so-called "scatter/gather" DMA scheme, which is one example of the DMA method, a storage section of the main memory is divided into a plurality of small storage areas commonly called "pages" so that the memory is managed on a page-by-page basis. Assuming that the main memory has a 32-Mbyte capacity and a virtual storage capacity is 4 Gbytes, each logical address can be expressed by 32 bits, each physical address by 25 bits and each address in each page by 12 bits. In such a case, the lower 12 bits in the logical address coincide with those of the physical address. However, because the individual pages are dispersed or scattered within the main memory, the 13th to 25th bits of the logical address do not necessarily coincide with the corresponding bits of the physical address. For this reason, it has been a common practice to transfer data after converting each logical address into a physical address using dedicated hardware.

When, for example, a predetermined quantity of data designated by consecutive logical addresses are to be transferred from the main memory to a particular device, the data within a certain page may be read out from the main memory using the lower 12 bits of the logical addresses by just identifying the location of that page in the main memory, because the data can be specified by the consecutive addresses. However, once the page is turned to another or next page, it is necessary to identify the other page. To this end, the conventional scheme generally employs dedicated hardware to detect each break between the pages. Upon detection of such a page break, the data transfer is suspended and an interrupt signal is generated, so that the following physical addresses can be acquired through an interrupt process routine executed by an operating system (abbreviated "OS") and the data transfer is then resumed using the thus-acquired physical addresses.

In recent years, many computer systems are equipped with a so-called tone generator LSI incorporated therein for reproduction of recorded tones. In many cases, tone waveform data corresponding to various tone colors or timbres, such as those of piano and guitar, are prestored in the main memory so that desired tones are reproduced on the basis of the tone waveform data read out from the main memory. However, in cases where the tone waveform data are prestored in storage areas that are dispersedly provided within the main memory, a great number of interrupts would occur in accessing the tone waveform data, undesirably lowering the data transfer efficiency. In particular, the frequent interrupt occurrence would present significant inconveniences in cases where a variety of tone colors, such as those of piano, guitar and drum, are sounded simultaneously. For example, if tones of 64 channels are to be generated simultaneously in such a situation where each page has a capacity of 4 Kbytes and the sampling frequency is 48 kHz, an interrupt occurs every 3 ms (=4 k/(48*64)), which would prevent a smooth data transfer.

In other cases where such a scatter/gather process is not performed, there arises a need to prestore all the tone waveform data in successive storage areas (i.e., storage areas with consecutive addresses). But, there is no guarantee that a large size of such successive storage areas can always be secured in the main memory. Further, in waveform replacement processes, such as a DLS (Download Sample) process, where a piano tone color, for example, is converted into a guitar tone color, it is necessary that tone waveform data designated by a higher-order application be read out from a hard disk and replaced with those already stored in the main memory. Even in ordinary waveform reproduction, there is no need to keep the tone waveform data stored in the main memory after termination of tone reproduction, so that the storage areas in the main memory are usually freed after the tone reproduction. Namely, because the storage areas for storing the tone waveform data are secured and then freed in these cases, the necessity of securing the successive storage areas is not very great; thus, taking up the large-size successive storage areas in the main memory would yield great adverse effects on other applications.

SUMMARY OF THE INVENTION

It is therefore an object of the present invention to provide a memory management method which permits efficient use of a main memory by securing successive storage areas and scattered storage areas in the main memory and appropriately using these areas in a selective manner, as well as a computer system and a tone generator system employing such a memory management method.

In order to accomplish the above-mentioned object, the present invention provides a memory management method for use in a computer system including a memory, which comprises: a managing step of dividing the memory into a first storage section secured as a succession of storage areas with consecutive addresses and a second storage section secured as scatterable storage areas corresponding to a plurality of pages each having consecutive addresses of a predetermined size, and thereby managing the first storage section and the second storage section separately from each other; and a deciding step of, in accordance with a characteristic of data to be stored, deciding which one of the first storage section and second storage section the data should be stored in, the data being stored in the one storage section.

For data readout from the first storage section, if at least information indicative of a single physical address corresponding to a start position of the first storage section is obtained, it is possible to identify all physical addresses corresponding to individual read addresses on the basis of the obtained physical address. For data readout from the second storage section, however, it is necessary to obtain information indicative of physical addresses corresponding to start positions of the individual pages. Thus, in reading out the data from the first storage section, it is only necessary to receive the single physical address at the beginning of the intended data readout; however, in reading out the data from the second storage section, its is necessary to, at each break between the pages ("page break"), receive the physical address for a succeeding one of the pages. Considering this, it is preferable that data having a relatively high frequency of use be stored in the first storage section and data having a relatively low frequency of use be stored in the second storage section. Thus, in reading out, from the memory, such data whose frequency of use is relatively high, the invention can significantly reduce the number or frequency of interrupt occurrences necessary for acquiring physical addresses and hence the loads on a central processing unit (CPU) of a computer used. Further, by storing less-frequently used data in the second storage section, the present invention can make efficient use of the limited memory space. As a result, the present invention achieves efficient memory management in a well-balanced manner.

According to another aspect of the present invention, there is provided a memory management method for use in a computer system including a memory, the memory management method which comprises: a managing step of dividing the memory into a first storage section secured as a succession of storage areas with consecutive addresses and a second storage section secured as scatterable storage areas corresponding to a plurality of pages each having consecutive addresses of a predetermined size, and thereby managing the first storage section and the second storage section separately from each other; a step of storing data to be stored in the memory in one of the first storage section and the second storage section; and a step of reading out the data stored in one of the first storage section and the second storage section, in accordance with management by the managing step.

Here, the managing step may manage storage information indicating which one of the first storage section and the second storage section the data are stored in, and logical and physical addresses of the data, and the step of reading may comprise: a first step of, when given data are to be read out from the memory and transferred to a particular device, determining on the basis of the storage information which one of the first storage section and the second storage section the given data are stored in; a second step of, when the given data to be transferred have been determined as stored in the first storage section, receiving, from the managing step, a physical address indicative of a start position of the first storage section to sequentially generate read addresses beginning with the physical address of the start position, and using the read addresses to read out the given data from the memory to thereby transfer the given data to the particular device; and a third step of, when the given data to be transferred have been determined as stored in the second storage section, receiving, from the managing step, a physical address indicative of a start position of each of the pages of the second storage section to sequentially generate read addresses, each in the form of a physical address, for each of the pages on the basis of the physical address received from the managing step, and using the read addresses to read out the given data from the memory to thereby transfer the given data to the particular device.

Further, the third step may include a step of sequentially generating logical read addresses, a step of detecting a break between the pages on the basis of the read addresses, and a step of, on the basis of a result of detection by the step of detecting, converting the logical read addresses into physical read addresses using the physical address indicative of a start position of each of the pages.

According to still another aspect of the present invention, there is provided a computer system which comprises: a memory; a processor that executes processes including: a managing process for dividing the memory into a first storage section secured as a succession of storage areas with consecutive addresses and a second storage section secured as scatterable storage areas corresponding to a plurality of pages each having consecutive addresses of a predetermined size, and thereby managing the first storage section and the second storage section separately from each other; a process for storing data in one of the first storage section and the second storage section; and a process for instructing that desired data be read out from the memory; and a memory access device that generates read addresses in accordance with a read instruction from the processor and uses the read addresses to access the memory for reading out the data therefrom.

In a preferred implementation, when the data to be read out from the memory are stored in the first storage section, the memory access device receives, from the processor, a physical address indicative of a start position of the first storage section to sequentially generate read addresses beginning with the physical address of the start position, and uses the read addresses to read out the data from the memory, and when the data to be read out from the memory are stored in the second storage section, the memory access device receives, from the processor, a physical address indicative of a start position of each of the pages of the second storage section to sequentially generate read addresses, each in the form of a physical address, for each of the pages on the basis of the physical address received from the processor, and uses the read addresses to read out the data from the memory.

Further, the memory access device may include: an address calculator that executes incremental read-address calculating operations, when the data to be read out from the memory are stored in the first storage section, the address calculator sequentially generating read addresses beginning with the physical address indicative of a start position of the first storage section, when the data to be read out from the memory are stored in the second storage section, the address calculator sequentially generating logical read address; a detector that when the data to be read out from the memory are stored in the second storage section, detects a break between the pages on the basis of the logical read addresses; and an address converter that, on the basis of a result of detection by the detector, converts the logical read addresses into physical read addresses using the physical address indicative of a start position of each of the pages.

The present invention may be implemented not only as a memory management method for use in a computer system but also as a computer system employing such a memory management method. The present invention may also be practiced as a recording medium storing a computer program for carrying out the memory management method. The data to be stored in the memory are, for example, tone waveform data, but the present invention may be applied to any other types of data than such waveform data.

BRIEF DESCRIPTION OF THE DRAWINGS

For better understanding of various features of the present invention, its preferred embodiments will hereinafter be described in greater detail, with reference to the accompanying drawings, in which:

FIG. 3 is a diagram showing exemplary details of a main memory in the embodiment;

FIG. 4 is a diagram explanatory of operation of an address calculator circuit in the embodiment;

DETAILED DESCRIPTION OF THE PREFERRED EMBODIMENTS

Figure 1:
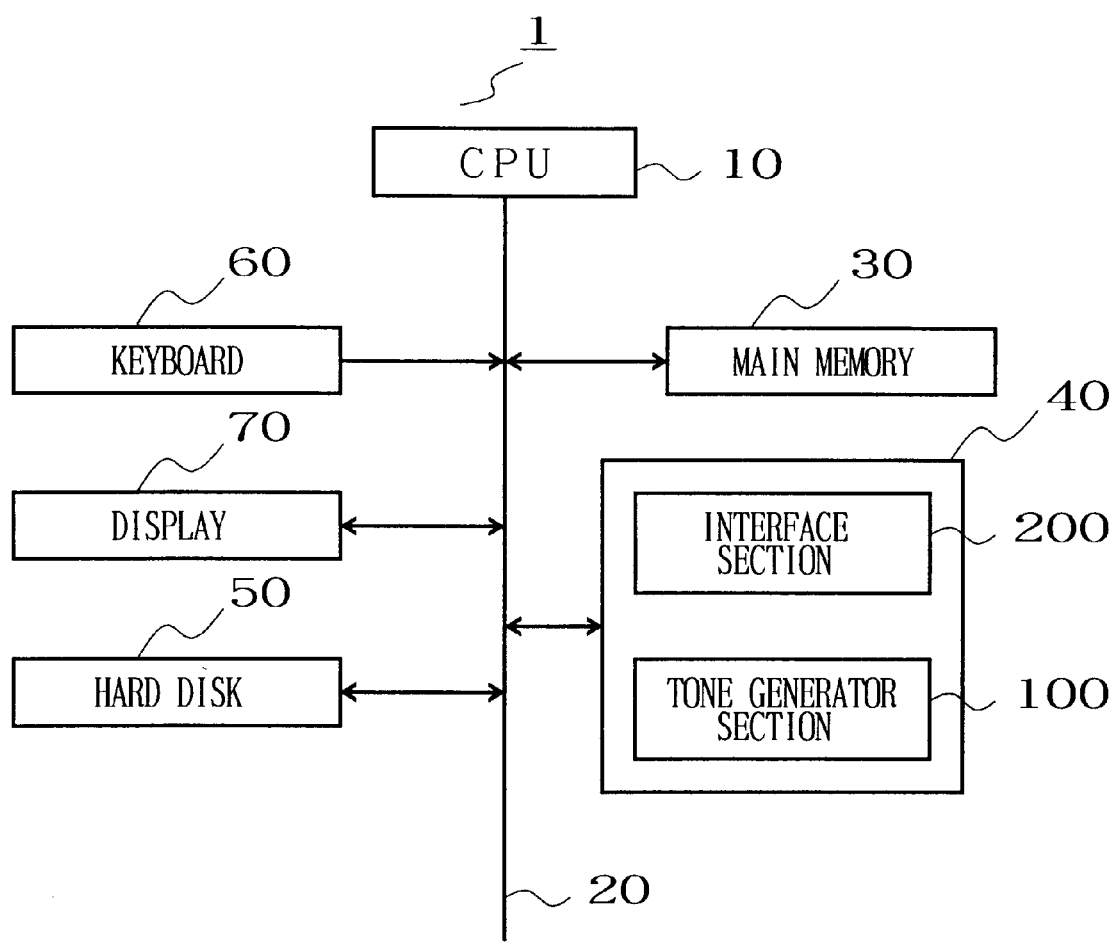
FIG. 1 is a block diagram illustrating a general organization of a computer system employing a memory management method in accordance with en embodiment of the present invention.

FIG. 1 is a block diagram illustrating a computer system using a memory management method in accordance with en embodiment of the present invention, which includes the following components.

In the computer system 1, a CPU 10 is connected via a bus 20 with various other components of the system and controls the entire system 1 for execution of various software programs. In the illustrated example, the bus 20 comprises a PCI (Peripheral Component Interconnect) bus capable of high-speed data transfer based on a burst transmission scheme.

Main memory 30, functioning as a main storage device in the system 1, stores therein various application programs and various data for use therein and also includes working areas to be used by the CPU 10.

Tone generator board 40 includes a tone generator section 100 and an interface section 200 and can be inserted into an extension slot. In the tone generator board 40, various sound processing is carried out under the control of any of the application programs. The tone generator section 100 uses a wave table that is provided in the main memory 30 and prestores tone waveform data sets WT corresponding to various tone colors, such as those of piano and guitar. Whenever necessary, the tone generator section 100 reads out one of the tone waveform data sets WT from the wave table, synthesizes the read-out tone waveform data after subjecting them to various processing such as pitch conversion. Further, the tone generator section 100 is capable of simultaneously generating 64 different types of tone colors through channels corresponding thereto. The interface section 200 has a so-called bus master function to have direct access to the main memory 30 without intervention of the CPU 10, so that it can deal with the burst transmission mode. The tone generator section 100 and interface section 200 will be more fully described later.

The computer system 1 of FIG. 1 also includes a hard disk 50, functions as a secondary storage device, where are prestored various data and programs for use in the sound processing. These data and programs can be transferred to the main memory 30 under the control of the CPU 10.

The computer system 1 further includes a keyboard 60 via which the user can enter an instruction, and a display unit 70 for visually displaying various characters and pictures.

Now, a description will be made below about structural details of the computer system 1, with reference to FIG. 2.

Among the various software to be rum by the CPU 10 are an application program 11, a hardware control driver 12 and a physical address acquisition/setting routine 13. The application program 11 is, for example, game software which is programmed to pass tone generating data to the hardware control driver 12 as the game progresses. The tone generating data are arranged, for example, in a MIDI (Musical Instrument Digital Interface) format and instruct tone generating parameters such as tone color and pitch parameters.

The hardware control driver 12 is activated at startup of the OS (Operating system) of the computer system 1, upon which the driver 12 requests the OS to secure or reserve successive storage areas A1 (i.e., storage areas with consecutive addresses) in the main memory 30. Once such successive storage areas A1 are reserved, those tone waveform data sets WT, whose expected frequency of use is relatively high, are read out from the hard disk 50 for storage in the secured successive storage areas A1, and other tone waveform data sets WT are stored into scattered storage areas A2 of the main memory 30 as necessary. At that time, the hardware control driver 12 manages each of the tone waveform data sets WT in association with the corresponding tone color and in accordance with storage area information as to whether the tone waveform data set WT is being stored in the successive storage areas A1 or in the scattered storage areas A2, and it also manages respective logical addresses L of the individual tone waveform data sets. The hardware control driver 12 also receives, from the OS, a physical address P where the successive storage areas A1 start, and retains the received physical address as offset information.

Upon receipt of the tone generating data from the application program 11, the hardware control driver 12 identifies a tone color, tone generating (sounding) timing, tone pitch, etc. designated by the tone generating parameters. After that, a determination is made, on the basis of the storage area information, as to whether the tone waveform data set WT corresponding to the designated tone color is stored in the successive storage areas A1 or in the scattered storage areas A2. If the corresponding tone waveform data set WT has been determined as stored in the successive storage areas A1, a physical address P is calculated on the basis of the above-mentioned offset information as well as the logical address L where the tone waveform data set begins. If, on the other hand, the corresponding tone waveform data set WT has been determined as stored in the scattered storage areas A2, a logical address L of the set is obtained. The physical address P or logical address L is then provided as a start address ADRs.

The thus-obtained start address ADRs and tone generating parameters, such as the tone generating (sounding) timing, tone pitch, etc. are passed to the tone generator section 100. Also, an "L/P" flag, indicative of whether the thus-passed address is the physical address P or the logical address L, is created on the basis of the storage area information and then sent to the interface section 200.

Physical address acquisition/setting routine 13 is part of the OS and is designed to set the physical address P on the basis of the logical address L.

The main memory 30 thus contains the successive storage areas A1 and scattered storage areas A2; the tone waveform data sets are stored at the consecutive addresses of the successive storage areas A1, while a single tone waveform data set is stored in the scattered storage areas A2 dispersedly on the page-by-page basis.

FIG. 3 shows exemplary details of the main memory 30. Assuming that the main memory 30 has a 64-Mbyte capacity and each page has a capacity of 4 Kbytes, the pages in the main memory 30 can be expressed by page numbers "1" to "1684". In the illustrated example of FIG. 3, the successive storage areas A1 are provided in consecutive pages from page numbers "1" to "n", while the scattered storage areas A2 are provided in dispersed pages from page numbers "n+1" to "1684". Specifically, in the successive storage areas A1, a tone waveform data set WT1 is stored in consecutive storage areas corresponding to page numbers "1", "2", . . . "m", and another tone waveform data set WT2 is stored in the following consecutive storage areas corresponding to page numbers "m+1", "m+2", . . . "m".

In the scattered storage areas A2, hatched blocks represent pages already occupied by another application program, and a tone waveform data set WT3 is stored in the remaining storage areas corresponding to page numbers "n+1", "n+4" and "1684".

Figure 2:
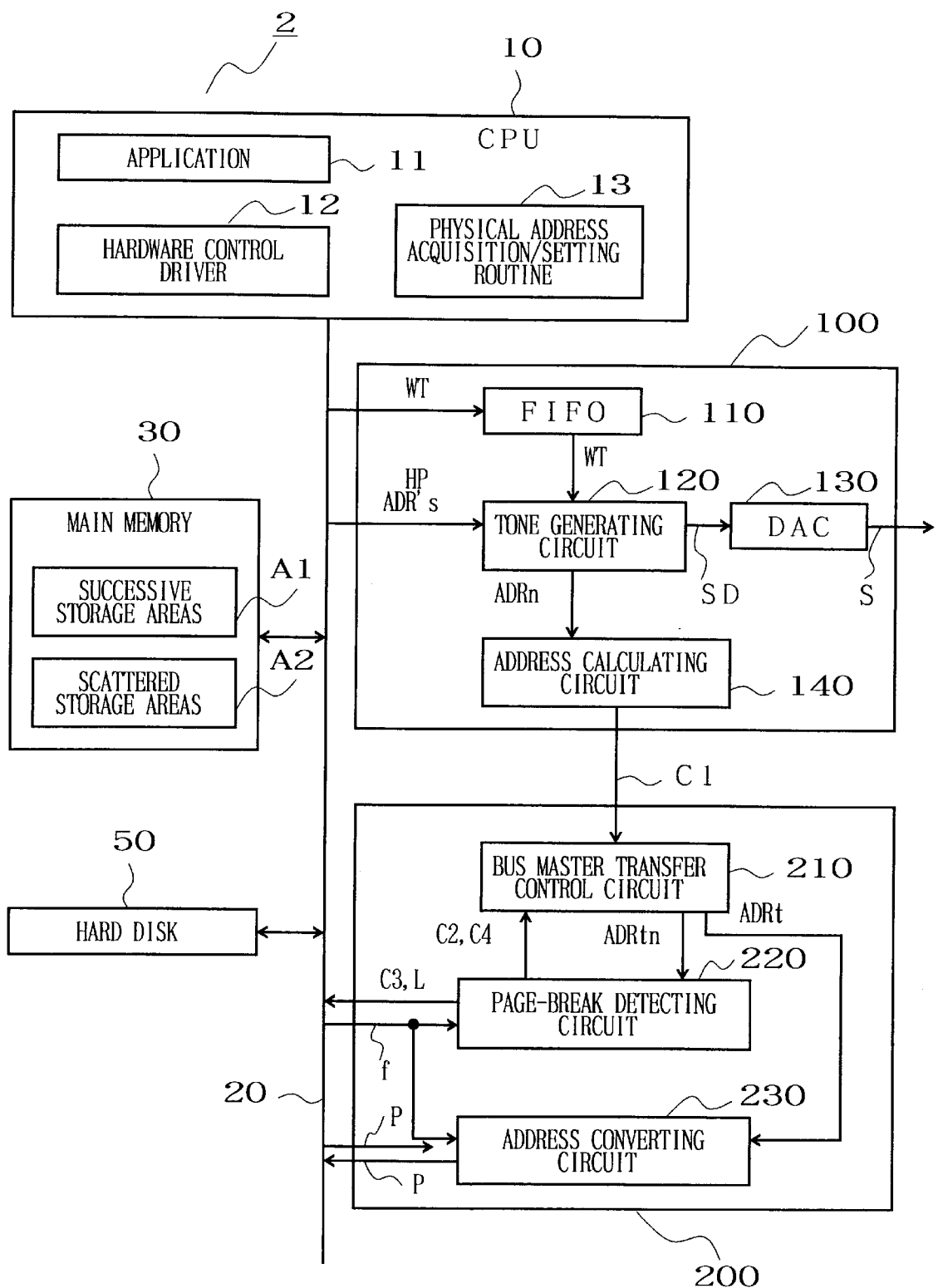
FIG. 2 is a block diagram showing structural details of the computer system of FIG. 1.

As shown in FIG. 2, the tone generator section 100 includes a FIFO (First-In First-Out) buffer 110, a tone generating circuit 120, a DAC (Digital/Analog Converter) 130 and an address calculating circuit 140. The FIFO buffer 110 serves to store the tone waveform data WT read out from the memory 30 in a desired processing order, whenever necessary.

The tone generating circuit 120 receives, from the hardware control driver 12, the start address ADRs and pitch information contained in the tone generating parameters HP, on the basis of which the circuit 120 carries out an interpolation process to calculate an address, of each tone waveform data WT to be reproduced, in such form containing a decimal fraction and sends the thus-calculated address to the address calculating circuit 140 as an interpolated address ADRi. Further, the tone generating circuit 120 carries out other processes, such as pitch conversion and tone volume adjustment, on the basis of the tone waveform data WT read out from the FIFO buffer 110 as well as the tone generating parameters HP, to thereby generate tone data SD. Each tone data SD generated by the tone generating circuit 120 is converted via the DAC 130 into an analog tone signal S.

On the basis of the decimal-fraction-containing interpolated address ADRi, the address calculating circuit 140 calculates addresses immediately before and after the interpolated address ADRi and issues a transfer location instruction CI indicating storage locations of data to be transferred. The transfer location instruction CI consists of a transfer start address ADRts indicative of an address at which the data transfer should start and the number of transfers (i.e., the number of consecutive addresses). If the interpolated address ADRi has varied from "5.25" through "6.5" to "7.75" (5.25→6.5→7.75), the address calculating circuit 140 specifies address values "5" and "6" for the interpolated address value "5.25", address values "6" and "7" for the interpolated address value "6.5", and address values "7" and "8" for the interpolated address value "7.75". In this case, "5, 6, 6, 7, 7, 8" are specified as the address values with duplication of the values "6" and "7". Thus, transfer locations are ultimately specified after such duplication of the address values is removed. According to the transfer location instruction CI in the illustrated example, the transfer start address ADRts takes a value of "5" and the number of transfers n takes a value of "4".

In the above-mentioned manner, the tone generator section 100 carries out the interpolation process to read out necessary tone waveform data WT and generates the transfer location instruction CI; however, because the interpolation process is based on the consecutive addresses and the pitch information, the tone generator section 100 can operate properly irrespective of whether the start address ADRs is the physical address P or the logical address L.

Figure 5:
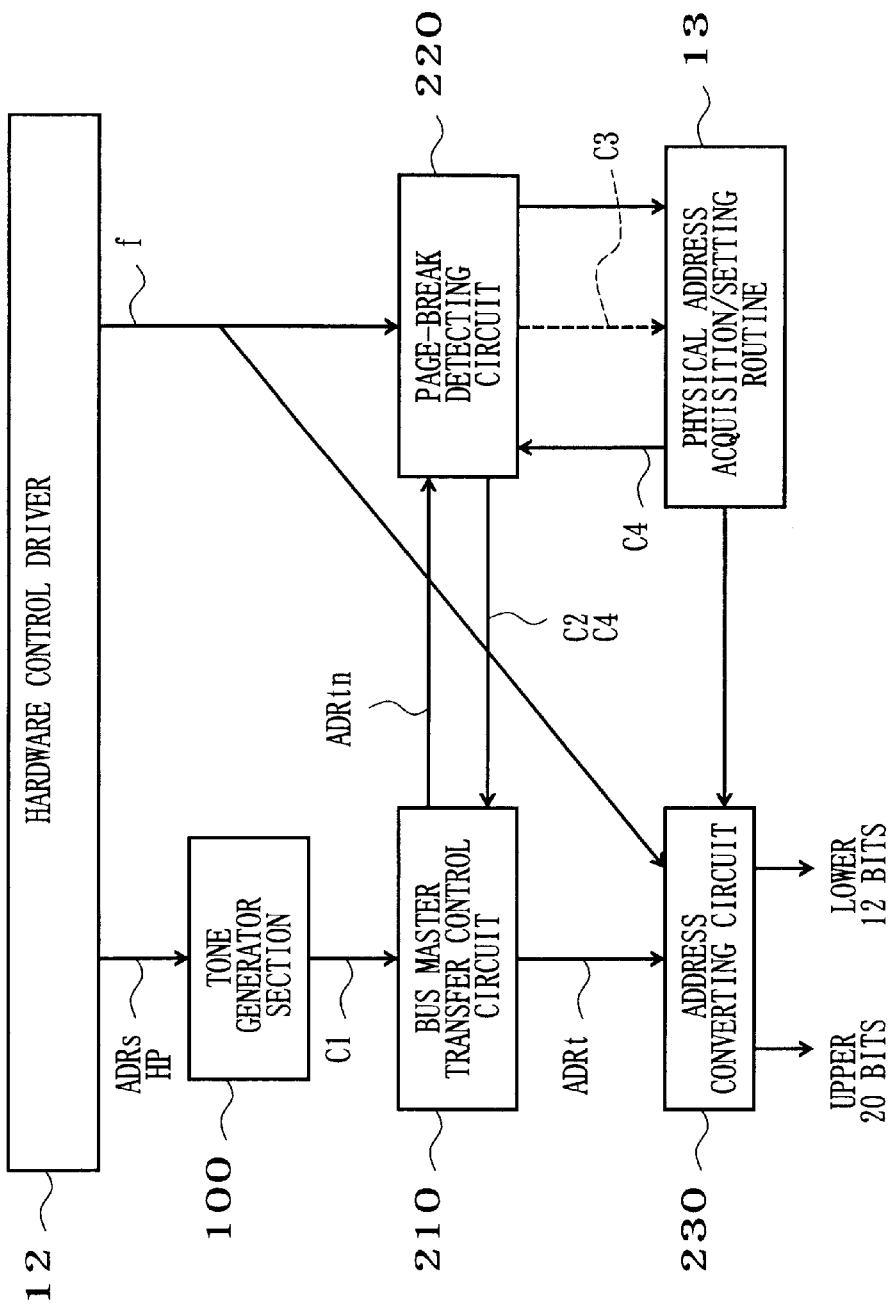
FIG. 5 is a block diagram showing an interface section in the embodiment.

Now, with reference to FIG. 5, a description will be made about the interface section 200. As shown in FIG. 5, the interface section 200 includes a bus master transfer control circuit 210, a page-break detecting circuit 220 and an address converting circuit 230.

The bus master transfer control circuit 210 is designed to generate a transfer address ADRt and a next transfer address ADRtn indicative of data to be next transferred, on the basis of the above-mentioned transfer location instruction CI. Each current transfer address ADRt is calculated by sequentially incrementing the transfer start address ADRts indicated by the transfer location instruction CI and each next transfer address ADRtn is calculated by incrementing the current transfer address ADRt. The current transfer address ADRt thus calculated is delivered to the address converting circuit 230, while the next transfer address ADRtn is delivered to the page-break detecting circuit 22. Note that behavior of the bus master transfer control circuit 210 is controlled on the basis of a transfer stop instruction C2 and transfer restart instruction C4.

Although, as noted earlier, the tone generator section 100 can operate properly irrespective of whether the start address ADRs sent from the hardware control driver 12 is the physical address P or the logical address L, it is necessary that all addresses for use in accessing the main memory 30 are physical addresses P. If the tone waveform data set WT in question is stored in the successive storage areas A1, then the hardware control driver 12 outputs the start address ADRs in the form of a physical address P as previously stated. In this case, various processing is executed in the tone generator section 100 on the basis of physical addresses P, so that each transfer address ADRt generated by the bus master transfer control circuit 210 is also expressed in a physical address P.

If, on the other hand, the tone waveform data set WT in question is stored in the scattered storage areas A2, then the start address ADRs is expressed in a logical address L, so that the transfer address ADRt is also expressed in a logical address L. Therefore, in this case, there arises a need to convert the transfer address ADRt from the logical to physical form. Because the scattered storage areas A2 are split on the page-by-page basis, the physical addresses become non-consecutive at each page break except where the tone waveform data WT are by chance stored across consecutive pages with consecutive address values. Therefore, whenever the tone waveform data transfer proceeds from one page to another (at each page break), it is necessary to know the physical address P corresponding to the transfer address ADRt. Stated otherwise, as long as the tone waveform data WT stored at the same page are transferred, the same physical address P may be used since there occurs no change in its upper bits, and it is necessary to acquire the physical address only upon turning of the page.

The page-break detecting circuit 220 is provided for that purpose. Namely, the page-break detecting circuit 220 is arranged to issue an interrupt instruction C3 by detecting a page break where the transfer location instruction CI is based on a logical address L, and it includes a comparator, register, etc. for use in such page-break detecting operations. This page-break detecting circuit 220 becomes operative only when the L/P flag f indicates a "logical address L". More specifically, the comparator is used for comparing respective upper bits (exceeding the page capacity) of an immediately preceding next transfer address and current next transfer addresses ADRtn and ADRtn, and it outputs an interrupt instruction C3. If the logical address L is a 32-bit address and each page consists of 12 bits, then the comparator 20 compares the upper 20 bits.

The current next transfer address ADRtn (logical address L) is stored in the register of the page-break detecting circuit 220 in advance. Upon receipt of the interrupt instruction C3 from the page-break detecting circuit 220, the physical address acquisition/setting routine 13 accesses the register to read out the stored logical address L and thereby generates a physical address P corresponding to the logical address L. Because the logical address L indicates a start position of a new page, the physical address acquisition/setting routine 13 generates a physical address P that also indicates the start position of the new page.

It should be noted that whenever a break between the pages is detected, the processing has to be suspended until the physical address P is acquired through the physical address acquisition/setting routine 13. Thus, once the page-break detecting circuit 220 detects such a page break, it issues a transfer stop instruction C2 to the bus master transfer control circuit 210. Also, once a transfer restart instruction C4 is received from the bus master transfer control circuit 210, the address acquisition/setting routine 13 forwards the transfer restart instruction C4 to the bus master transfer control circuit 210.

The above-mentioned address converting circuit 230 is arranged to convert the transfer address ADRt to a physical address P with reference to the L/P flag f and includes a selector, a register, etc. for such converting operations. The physical address P acquired through the physical address acquisition/setting routine 13 is written into the register, and the selector selects and outputs the data stored in the register and the transfer address ADRt on the basis of the L/P flag f. More specifically, if the L/P flag f indicates a physical address P, then the selector outputs the transfer address ADRt as received from the transfer control circuit 210 because the transfer address ADRt is expressed in a physical address. If, on the other hand, the L/P flag f indicates a logical address P, then the selector outputs a transfer address ADRt that consists of the received transfer address ADRt as its lower bits indicative an address within a page and the physical address P stored in the register as its upper bits indicative of a page number and the like.

Once the physical address P is created in the above-mentioned manner, access is made to the main memory 30 using the physical address, so that the tone waveform data WT are read out and sequentially stored into the FIFO buffer 110 of the tone generator section 100.

Figure 6:
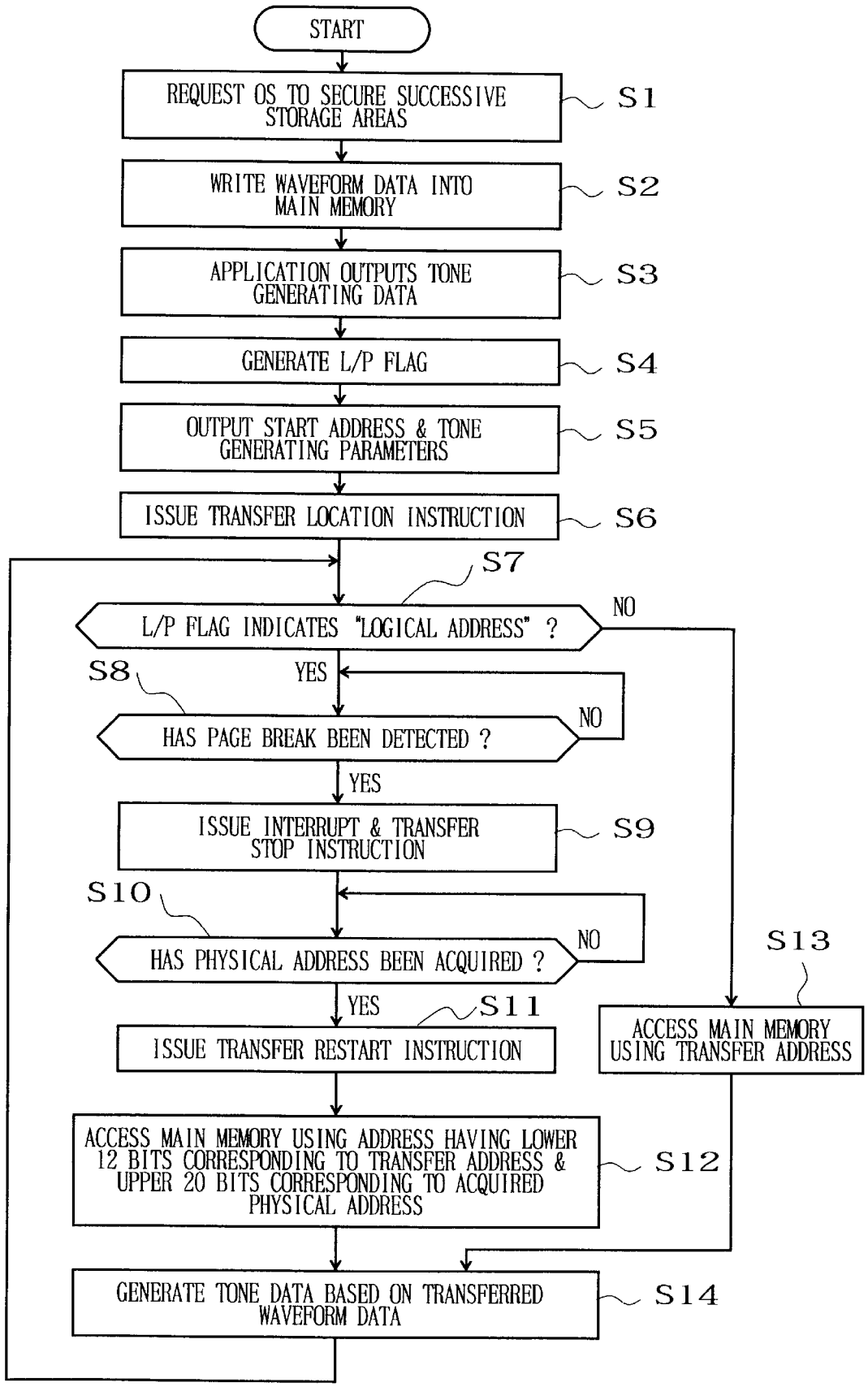
FIG. 6 is a flow chart showing an exemplary operational sequence of the memory management in the computer system in accordance with the embodiment.

Now, a detailed description will be made hereinbelow about the memory management in the computer system 1, with reference to the drawings. FIG. 6 is a flow chart showing an exemplary operational sequence of the memory management in the computer system 1 in relation to the sound processing.

As the hardware control driver 12 is activated at startup of the OS, the control driver 12 requests the OS to secure the successive storage areas A1 (i.e., storage areas with consecutive addresses) in the main memory 30 at step Si. Once such successive storage areas A1 are secured, the hardware control driver 12 writes the tone waveform data sets WT into the main memory at step S2. Specifically, the tone waveform data sets WT, which are previously recorded in the hard disk 50 via the program, are read out from the hard disk 50 for storage in the secured successive storage areas A1, and any other necessary tone waveform data set WT is stored into the scattered storage areas A2. In this way, those tone waveform data sets WT, corresponding to frequently-used tone colors, can be stored in the successive storage areas A1 and other tone waveform data set WT corresponding to a less-frequently-used tone color can be stored in the scattered storage areas A2, so that the stored tone waveform data sets WT can be properly handled in accordance with their data characteristics.

Then, when the application program 11 outputs tone generating data at step S3, the hardware control driver 12 decides which one of the successive storage areas A1 and the scattered storage areas A2 the tone waveform data set WT corresponding to a tone color designated by the tone generating data is stored in, and creates an L/P flag f on the basis of the decided result to pass the flag f to the interface section 200, at step S4.

Also, at step S4, the hardware control driver 12 generates the start address ADRs on the basis of the decided result and logical address L indicative of the start position of the tone waveform data set WT and supplies the tone generator section 100 with tone pitch and volume information, obtained from the tone generating data, as tone generating parameters HP.

After that, at step S6, the tone generator section 100 carries out address calculation and the like for the interpolation process based on these pieces of information, in order to specify transfer locations of the tone waveform data WT in question and issue a transfer location instruction CI to the bus master transfer control circuit 210 of the interface section 200. Because the transfer location instruction CI is made up of the transfer start address ADRts and the number of transfers n as noted earlier, the bus master transfer control circuit 210 can create a transfer address ADRt by incrementing the transfer start address ADRts.

At next step S7, a determination is made as to whether the L/P flag f is indicative of a logical address L. If answered in the affirmative, it means that the tone waveform data set WT in question is stored in the scattered storage area A2, so that the physical address P becomes non-consecutive at each page break. Thus, with the affirmative determination at step S7, step S8 is taken for determining whether a break between the pages has been detected. When the page-break detecting circuit 220 has detected such a page break, the interrupt instruction C3 and transfer stop instruction C2 are issued at step S9.

The bus master transfer control circuit 210 suspends the generation of the transfer address ADRt in response to the transfer stop instruction C2, and the physical address acquisition/setting routine 13 accesses the page-break detecting circuit 220 in response to the interrupt instruction C3 to acquire the next transfer address ADRtn expressed in a logical address L. Then, after a physical address P corresponding to the logical address L has been calculated as determined at step S10, the bus master transfer control circuit 210 sets the calculated physical address P in the register of the address converting circuit 230.

After the physical address acquisition/setting routine 13 has issued a transfer restart instruction C4 at step S11, the instruction C4 is delivered via the page-break detecting circuit 220 to the bus master transfer control circuit 210 to restart the suspended generation of the transfer address ADRt.

After that, the address converting circuit 230, at step S12, creates a physical address that consists of the received transfer address ADRt as its lower bits indicative an address within the page and the physical address P stored in the register as its upper bits indicative of the page number and the like, and uses the created physical address P to read out the tone waveform data WT from the main memory 30.

If, however, the L/P flag f is indicative of a physical address P, then no address conversion is required, so that the address converting circuit 230, at step S12, outputs the transfer address ADRt exactly as received and uses the transfer address ADRt to read out the tone waveform data WT from the main memory 30.

The tone waveform data WT read out in the above-mentioned manner is stored in the FIFO buffer 110 of the tone generator section 100 in such a manner that the tone generating circuit 120 generates tone data SD on the basis of the tone waveform data WT output from the FIFO buffer 110 at step S14. After that, the flow loops back to step S7 to repeat the operations at steps S7 to S14 so that a tone signal S is reproduced on the basis of the tone data SD.

As has been described above, the preferred embodiment is arranged to store those frequently-used tone waveform data sets (those having a relatively high expected frequency of use) in the successive storage areas A1. Thus, most of the tone signals S to be reproduced on the basis of the tone generating data can be generated by reading out the tone waveform data WT stored in the successive storage areas A1. As a consequence, the number of the interrupt instructions C3 to be issued at the individual page breaks can be greatly reduced as compared to the case where all of the tone waveform data sets WT are stored in the scattered storage areas A2, so that a smooth data transfer is always achieved even in the case where a plurality of tone colors are to be sounded simultaneously.

Further, with the arrangement that the less-frequently-used tone waveform data set WT is stored in the scattered storage areas A2 in stead of all the tone waveform data sets WT being stored in the successive storage areas A1, it is possible to reduce adverse effects on other application software and the memory management in the overall computer system 1 can be performed in a well-balanced manner.

Furthermore, because it is not necessary for the tone generator section 100 to behave differently depending on whether the start address ADRs is a logical address L or a physical address P, the tone generator section 100 can operate at high speed with a simple structure.

Whereas only a preferred embodiment has been described so far, it should be appreciated that the present invention is not so limited and may be modified variously as follows.

Although the bus 20 connecting the tone generator board 40 and the main memory 30 in the embodiment has been described as being a PCI bus, an AGP (Accelerated Graphics Port) bus may be employed in place of the PCI bus. It is not necessarily essential for the bus 20 to support the burst transmission mode.

The preferred embodiment has been described above as pre-registering frequently-used tone waveform data sets WT in a program, in order to decide depending on the frequency of use of the data set WT whether each tone waveform data set WT should be stored in the successive storage areas A1 or in the scattered storage areas A2. Alternatively, if a genre of a music piece to be reproduced is known, such a tone waveform data set WT corresponding to the musical genre may be stored into the successive storage areas A1. What is essential here is to decide appropriately in accordance with characteristics of the tone waveform data set whether the tone waveform data set WT should be stored in the successive storage areas A1 or in the scattered storage areas A2.

Whereas the embodiment has been described as activating the hardware control driver 12 at startup of the OS and securing the successive storage areas A1 upon activation of the control driver, the successive storage areas A1 may be secured at any other time when there arises the need to secure the storage areas. Further, the size of the successive storage areas A1 may be varied in a flexible manner.

Figure 7:
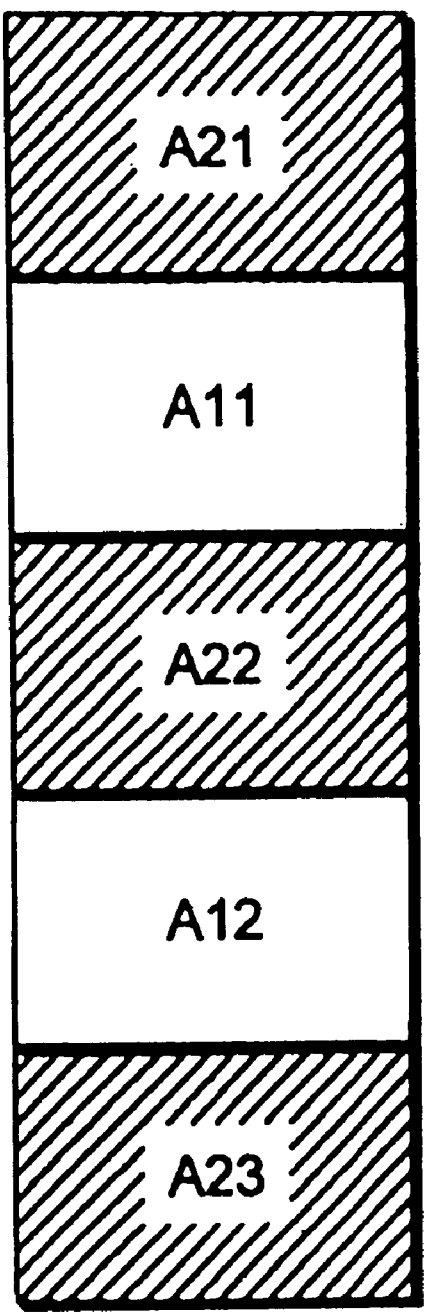
FIG. 7 is a diagram showing a modification of the main memory employed in the computer system.

Furthermore, whereas the embodiment has been described above as securing only a set of the successive storage areas A1 in the main memory 30, a plurality of sets (e.g., four sets) of such successive storage areas A1 may be secured. Further, it is not always necessary for the successive storage areas A1 to start at the beginning of the main memory 30. For example, FIG. 7 shows a modification of the main memory 30 that includes two sets of successive storage areas A11 and A12 and three sets of scattered storage areas A21, A22 and A23, where the two sets of successive storage areas A11 and A12 start at intermediate points within the main memory 30. Furthermore, each of the tone waveform data sets WT may be stored in a different set of successive storage areas.

Although the above-described embodiment does not consider a case where the successive storage areas are varied in position within the main memory 30, the physical positions, within the main memory 30, of the successive storage areas may be varied in accordance with the convenience of the OS. In this case, the hardware control driver 12 is allowed to generate a physical address P, on the basis of the logical address L and offset information, by the OS modifying the offset information in response to the movement of the storage areas.

Moreover, the tone generating function of the tone generator board 40 may be performed by the CPU 10 executing a software tone generator program rather than using hardware.

Whereas the preferred embodiment has been described in relation to the case where the computer system is implemented as a tone generator system, the memory management method of the present invention is not so limited and may of course be applied to other computer systems of a more ordinary type. In such a case, it is only necessary that the tone generator section 100 of FIG. 5 be removed and the master bus control circuit 30 be supplied with an address generated by the hardware control driver 12 in stead of the transfer location instruction CI.

In summary, the present invention is characterized by selectively storing data in first and second storage sections, i.e., successive storage areas and scattered storage areas in accordance with characteristics of the data. With this feature, the present invention can significantly reduce the number of interrupt occurrences necessary for acquiring physical addresses and adverse effects or loads on other application software, so that it achieves memory management in a well-balanced manner.

What is claimed is:

1. A memory management method for use in a computer system including a memory, said memory management method comprising:

a managing step of dividing said memory into a first storage section secured as a succession of storage areas with consecutive addresses and a second storage section secured as scatterable storage areas corresponding to a plurality of pages each having consecutive addresses of a predetermined size, and thereby managing said first storage section and said second storage section separately from each other; and a deciding step of, in accordance with a characteristic of data to be stored, deciding which one of said first storage section and second storage section said data should be stored in, said data being stored in the one storage section, wherein said deciding step decides which one of said first storage section and second storage section said data should be stored in, in accordance with an expected frequency of use of said data to be stored.

2. A memory management method as recited in claim 1 wherein said first storage section is greater in size than each of the pages of said second storage section.

3. A memory management method as recited in claim 1 wherein at least one of the size and physical position of said first storage section is changeable.

4. A memory management method as recited in claim 1, wherein said first storage section includes a plurality of sets of succession of storage areas with consecutive addresses.

5. A memory management method as recited in claim 4, wherein a different data file is stored in each of said plurality of sets of succession of storage areas.

6. A memory management method as recited in claim 1, wherein when the expected frequency of use of said data to be stored is relatively high, it is decided that said data should be stored in said first storage section, while when the expected frequency of use of said data to be stored is relatively low, it is decided that said data should be stored in said second storage section.

7. A memory management method as recited in claim 1 which further comprises a step of reading out data stored in said memory.

8. A memory management method as recited in claim 1 wherein a different data file is stored in each of said first storage section and said second storage section.

9. A memory management method as recited in claim 1 wherein a plurality of different data files can be stored in said second storage section.

10. A memory management method for use in a computer system including a memory, said memory management method comprising:
a managing step of dividing said memory into a first storage section secured as a succession of storage areas with consecutive addresses and a second storage section secured as scatterable storage areas corresponding to a plurality of pages each having consecutive addresses of a predetermined size, and thereby managing said first storage section and said second storage section separately from each other;
a deciding step of, in accordance with a characteristic of data to be stored, deciding which one of said first storage section and second storage section said data should be stored in, said data being stored in the one storage section; and
reading out data stored in said memory, wherein the data stored in said memory are a plurality of sets of tone waveform data, and said step of reading out selectively reads out a desired one of the plurality of sets of tone waveform data from said memory.

11. A memory management method for use in a computer system including a memory, said memory management method comprising:
a managing step of dividing said memory into a first storage section secured as a succession of storage areas with consecutive addresses and a second storage section secured as scatterable storage areas corresponding to a plurality of pages each having consecutive addresses of a predetermined size, and thereby managing said first storage section and said second storage section separately from each other;
a step of storing data to be stored in said memory in one of said first storage section and said second storage section; and
a step of reading out the data stored in one of said first storage section and said second storage section, in accordance with management by said managing step, wherein said managing step manages storage information indicating which one of said first storage section and said second storage section the data are stored in, and logical and physical addresses of the data, and wherein said step of reading comprises:
a first step of, when given data are to be read out from said memory and transferred to a particular device, determining on the basis of the storage information which one of said first storage section and said second storage section the given data are stored in;
a second step of, when the given data to be transferred have been determined as stored in said first storage section, receiving, from said managing step, a physical address indicative of a start position of said first storage section to sequentially generate read addresses beginning with the physical address of the start position, and using the read addresses to read out the given data from said memory to thereby transfer the given data to the particular device; and
a third step of, when the given data to be transferred have been determined as stored in said second storage section, receiving, from said managing step, a physical address indicative of a start position of each of the pages of said second storage section to sequentially generate read addresses, each in the form of a physical address, for each of the pages on the basis of the physical address received from said managing step, and using the read addresses to read out the given data from said memory to thereby transfer the given data to the particular device,
wherein said third step includes a step of sequentially generating logical read addresses, a step of detecting a break between the pages on the basis of the read addresses, and a step of, on the basis of a result of detection by said step of detecting, converting said logical read addresses into physical read addresses using said physical address indicative of a start position of each of the pages.

12. A computer system comprising:
a memory;
a processor that executes processes including:
a managing process for dividing said memory into a first storage section secured as a succession of storage areas with consecutive addresses and a second storage section secured as scatterable storage areas corresponding to a plurality of pages each having consecutive addresses of a predetermined size, and thereby managing said first storage section and said second storage section separately from each other;
a process for storing data in one of said first storage section and said second storage section;
a process for instructing that desired data be read out from said memory; and
a memory access device that generates read addresses in accordance with a read instruction from said processor and uses the read addresses to access said memory for reading out the data therefrom,
wherein when the data to be read out from said memory are stored in said first storage section, said memory access device receives, from said processor, a physical address indicative of a start position of said first storage section to sequentially generate read addresses beginning with the physical address of the start position, and uses the read addresses to read out the data from said memory,
wherein when the data to be read out from said memory are stored in said second storage section, said memory access device receives, from said processor, a physical address indicative of a start position of each of the pages of said second storage section to sequentially generate read addresses, each in the form of a physical address, for each of the pages on the basis of the physical address received from said processor, and uses the read addresses to read out the data from said memory, and wherein said memory access device includes:

an address calculator that executes incremental read-address calculating operations, when the data to be read out from said memory are stored in said first storage section, said address calculator sequentially generating read addresses beginning with the physical address indicative of a start position of said first storage section, when the data to be read out from said memory are stored in said second storage section, said address calculator sequentially generating logical read addresses;

a detector that when the data to be read out from said memory are stored in said second storage section, detects a break between the pages on the basis of the logical read addresses; and an address converter that, on the basis of a result of detection by said detector, converts said logical read addresses into physical read addresses using said physical address indicative of a start position of each of the pages.

13. A tone generator system comprising:

a memory that stores therein sets of waveform data corresponding to a plurality of tone colors;

a central processing unit that manages physical addresses of said memory in association with logical addresses of said memory; and a tone generating unit that reads out a necessary one of the sets of waveform data from said memory in accordance with tone-generation instructing information indicative of a color and pitch of a tone to be generated, wherein said central processing unit divides said memory into a first storage section secured as a succession of storage areas with consecutive addresses and a second storage section secured as scatterable storage areas corresponding to a plurality of pages each having consecutive addresses of a predetermined size, and thereby manages said first storage section and said second storage section separately from each other, each of the sets of waveform data is stored in one of said first storage section and said second storage section depending on a characteristic of the waveform data, and said tone generating unit receives management information to manage said memory for the waveform data of the tone to be generated and generates read addresses depending on which one of said first storage section and said second storage section the waveform data are stored in and then using the read addresses to read out the waveform data from said memory.

14. A tone generator system as recited in claim 13 wherein when the waveform data to be read out from said memory are stored in said first storage section, said tone generating unit receives, from said central processing unit, a physical address indicative of a start position of said first storage section to sequentially generate read addresses beginning with the physical address of the start position, and uses the read addresses to read out the waveform data from said memory, and wherein when the waveform data to be read out from said memory are stored in said second storage section, said tone generating unit receives, from said central processing unit, a physical address indicative of a start position of each of the pages of said second storage section to sequentially generate read addresses, each in the form of a physical address, for each of the pages on the basis of the physical address received from said central processing unit, and uses the read addresses to read out the waveform data from said memory.

15. A tone generator system as recited in claim 14 wherein said tone generating unit includes:

an address calculator that executes incremental read-address calculating operations, when the waveform data to be read out from said memory are stored in said first storage section, said address calculator sequentially generating read addresses beginning with said physical address indicative of a start position of said first storage section, when the waveform data to be read out from said memory are stored in said second storage section, said address calculator sequentially generating logical read addresses;

a detector that when the waveform data to be read out from said memory are stored in said second storage section, detects a break between the pages on the basis of the logical read addresses; and an address converter that, on the basis of a result of detection by said detector, converts said logical read addresses into physical read addresses using said physical address indicative of a start position of each of the pages.

16. A memory management method for use in a computer system including a memory, said memory management method comprising the steps of:

dividing said memory into a first storage section secured as a succession of storage areas with consecutive addresses and a second storage section secured as scatterable storage areas corresponding to a plurality of pages each having consecutive addresses of a predetermined size, and thereby managing said first storage section and said second storage section separately from each other;

in accordance with a characteristic of data to be stored, deciding which one of said first storage section and second storage section said data should be stored in, said data being stored in the one storage section;

managing storage information indicating which one of said first storage section and said second storage section the data are stored in as well as logical addresses of the data, and also managing a physical address of a start position of said first storage section as offset information;

when the data are to be transferred from said memory to a particular device, determining on the basis of the storage information which one of said first storage section and said second storage section the data are stored in;

when the data to be transferred have been determined as stored in said first storage section, calculating physical addresses on the basis of the logical addresses of the data and the offset information and using the calculated physical addresses to read out and transfer the data from said memory to the particular device;

when the data to be transferred have been determined as stored in said second storage section, calculating logical addresses for reading out the data and detecting a break between the pages on the basis of the calculated logical addresses;

each time the break between the pages is detected, acquiring physical addresses corresponding to logical addresses of a succeeding one of the pages; and when access is to be made to the succeeding page on the basis of the calculated logical addresses, using predetermined lower bits of the calculated logical addresses as predetermined lower bits of read addresses corresponding to a capacity of the page and using predetermined upper bits of the acquired physical addresses as upper bits, higher in place than the predetermined lower bits, of the read addresses, to thereby read out the data from said memory by use of the read addresses made up of the predetermined lower and upper bits and transfer the read-out data to the particular device.

17. A computer system including a memory, a central arithmetic processing unit and a particular device, said computer system comprising:

first management means that divides said memory into a first storage section secured as a succession of storage areas with consecutive addresses and a second storage section secured as scatterable storage areas corresponding to a plurality of pages each having consecutive addresses of a predetermined size, and thereby manages said first storage section and said second storage section separately from each other;

decision means that, in accordance with a characteristic of data to be stored, decides which one of said first storage section and second storage section said data should be stored in;

second management means that manages storage information indicating which one of said first storage section and said second storage section the data are stored in as well as logical addresses of the data, and also manages a physical address of a start position of said first storage section as offset information;

determination means that, when the data are to be transferred from said memory to the particular device, determines on the basis of the storage information which one of said first storage section and said second storage section the data are stored in;

address generator means that, when the data to be transferred have been determined as stored in said first storage section, generates and outputs physical addresses on the basis of the logical addresses of the data and the offset information and, when the data to be transferred have been determined as stored in said second storage section, outputs the logical addresses of the data;

flag generator means that, on the basis of the storage information, generates a flag indicating whether the addresses outputted by said address generator means are the logical addresses or the physical addresses;

page break detector means that, when the flag indicates the logical address, detecting a break between the pages on the basis of the logical addresses outputted by said address generator means; and data transfer means that, when the flag indicates the physical address, uses the addresses outputted by said address generator means to transfer the data from said memory to the particular device, and, when the flag indicates the logical address, receives a physical address of a succeeding one of the pages from said central arithmetic processing unit upon detection of each break between the pages and uses a combination of the physical address from said central arithmetic processing unit and the logical addresses of the data to transfer the data from said memory to the particular device.

18. A tone generator system including a memory for storing therein sets of waveform data corresponding to a plurality of tone colors, and a central arithmetic processing unit for managing physical addresses of said memory in association with logical addresses of said memory, and reproducing tone data on the basis of tone generating data indicative of a tone color and pitch, said tone generator system comprising:

first management means that divides said memory into a first storage section secured as a succession of storage areas with consecutive addresses and a second storage section secured as scatterable storage areas corresponding to a plurality of pages each having consecutive addresses of a predetermined size, and thereby manages said first storage section and said second storage section separately from each other;

decision means that, in accordance with a characteristic of waveform data to be stored, decides which one of said first storage section and second storage section the waveform data should be stored in;

second management means that manages storage information indicating which one of said first storage section and said second storage section the waveform data are stored in as well as logical addresses of the waveform data, and also manages a physical address of a start position of said first storage section as offset information;

specification means that, when the tone generating data is received, specifies one of the sets of the waveform data corresponding to the tone color designated by the tone generating data;

determination means that determines on the basis of the storage information which one of said first storage section and said second storage section the waveform data specified by said specification means are stored in;

address generator means that, when the waveform data have been determined as stored in said first storage section, generates and outputs physical addresses on the basis of the logical addresses of the waveform data and the offset information, and, when the waveform data have been determined as stored in said second storage section, outputs the logical addresses of the waveform data;

a tone generator device that generates transfer addresses of the waveform data on the basis of the addresses generated by said address generator means and the tone pitch designated by the tone generating data and generates the tone generating data on the basis of the waveform data received from the transfer addresses;

flag generator means that, on the basis of the storage information, generates a flag indicating whether the addresses outputted by said address generator means are the logical addresses or the physical addresses;

page break detector means that, when the flag indicates the logical address, detecting a break between the pages on the basis of the logical addresses outputted by said address generator means; and data transfer means that, when the flag indicates the physical address, uses the addresses outputted by said address generator means to transfer the waveform data from said memory to said tone generator device, and, when the flag indicates the logical address, receives a physical address of a succeeding one of the pages from said central arithmetic processing unit upon detection of each break between the pages by said page break detector means and uses a combination of the physical address from said central arithmetic processing unit and the logical addresses of the waveform data to transfer the waveform data from said memory to said tone generator device.

19. A tone generator system as recited in claim 18 wherein said page break detector means detects the break between the pages by monitoring upper bits of the transfer addresses that are higher in place than predetermined lower bits thereof corresponding to a capacity of the page.

* * * * *